US006629632B1

(12) United States Patent
Jack et al.

(10) Patent No.: US 6,629,632 B1
(45) Date of Patent: Oct. 7, 2003

(54) APPARATUS AND METHOD FOR MANUFACTURING HOLLOW SHAFTS

(75) Inventors: Robert G. J. Jack, Calgary (CA); Geoffrey Brook, Calgary (CA)

(73) Assignee: IUSRD (Ireland) Limited, Dublin (IE)

( * ) Notice: Subject to any disclaimer, the term of this patent is extended or adjusted under 35 U.S.C. 154(b) by 0 days.

(21) Appl. No.: 09/705,482

(22) Filed: Nov. 3, 2000

(30) Foreign Application Priority Data

Jun. 22, 2000 (IE) .......................................... S20000510

(51) Int. Cl.[7] ........................ B23K 31/02; B23K 37/00; B21D 39/00; B21D 51/28
(52) U.S. Cl. ...................... 228/147; 228/144; 228/150; 228/173.4; 228/173.5; 228/17.5; 72/52
(58) Field of Search .......................... 228/173.4, 173.5, 228/147, 150, 17.5, 144; 72/52

(56) References Cited

U.S. PATENT DOCUMENTS

| 3,361,319 A | | 1/1968 | Sato et al. ........................ 228/7 |
|---|---|---|---|
| 3,648,008 A | * | 3/1972 | Kawato et al. ............. 219/104 |
| 3,683,471 A | * | 8/1972 | Lemelson ................... 29/33 C |
| 3,684,150 A | * | 8/1972 | Lemelson ................... 228/3.1 |
| 3,784,081 A | * | 1/1974 | Karmann et al. ............. 228/17 |
| 3,927,292 A | | 12/1975 | Worden ........................ 219/67 |
| 3,997,097 A | * | 12/1976 | Embury ....................... 228/17 |
| 4,459,457 A | * | 7/1984 | Jurek .......................... 219/110 |
| 4,649,256 A | * | 3/1987 | Minamida et al. ...... 219/121.62 |
| 4,776,194 A | * | 10/1988 | Chang ............................. 72/12 |
| 4,788,405 A | * | 11/1988 | Haigh et al. ................. 219/109 |
| 4,849,601 A | * | 7/1989 | Haefner et al. ............. 219/110 |
| 4,905,885 A | * | 3/1990 | Hellman, Sr. ............... 228/144 |
| 4,971,239 A | * | 11/1990 | Tyler et al. ................. 219/61.3 |
| 5,386,092 A | * | 1/1995 | Dufrenne ................. 219/117.1 |
| 5,494,209 A | * | 2/1996 | Randlett et al. ............. 228/147 |
| 5,673,579 A | * | 10/1997 | Hashimoto et al. .......... 72/14.4 |
| 5,732,874 A | * | 3/1998 | Borzym et al. ............. 228/147 |
| 5,857,255 A | * | 1/1999 | Wichmann ................. 228/148 |
| 5,862,694 A | * | 1/1999 | Horning ....................... 72/181 |
| 6,216,511 B1 | * | 4/2001 | Ohnishi et al. ............... 72/113 |

FOREIGN PATENT DOCUMENTS

| DE | 3500806 A1 | * | 7/1986 |
|---|---|---|---|
| FR | 926683 | | 5/1946 |

* cited by examiner

*Primary Examiner*—Tom Dunn
*Assistant Examiner*—L. Edmondson
(74) *Attorney, Agent, or Firm*—Van Dyke, Gardner, Linn & Burkhart, LLP

(57) ABSTRACT

An apparatus and method for welding a shaft having an open seam defined between opposed longitudinal edges. The method comprising passing the shaft along its longitudinal axis through an array of pressure rollers which contact the surface of the shaft at a plurality of discrete points and compress the shaft by applying inwardly directed radial forces to the shaft. An electrical resistance welding assembly welds the seam while closed by the pressure rollers.

30 Claims, 17 Drawing Sheets

APPARATUS AND METHOD FOR MANUFACTURING HOLLOW SHAFTS

TECHNICAL FIELD

This invention relates to the manufacture of hollow shafts having a longitudinal seam.

BACKGROUND OF THE INVENTION

The manufacture of such hollow shafts generally involves forming a flat sheet of material into a generally cylindrical structure having an open seam but which is nevertheless in substantially the same shape as the desired finished shaft (referred to herein as an "open shaft"). The forming may be done using a series of stamping operations with curved male and female stamping dies, or the flat sheet may be fed through a series of roll forming machines which progressively bend the sheet.

The open shaft, with its open seam, is then fed from the roll forming machines to a welding machine which closes and welds the open seam to provide a closed shaft.

FIG. 1 shows a known method of closing the seam. An open shaft 10 is fed between a pair of cylindrical rollers 12, 14 which between them compress the shaft to close the seam 16. Welding occurs in a zone 18 where the opposed edges 20 of the seam meet due to the seam 16 being forced closed by the rollers 12, 14.

FIG. 2 shows the rollers of FIG. 1 in sectional elevation, along the line II—II in FIG. 1. The rollers 12, 14 have axes of rotation 22 parallel to one another and perpendicular to the axis of the shaft 10. As seen in FIG. 1, the shaft 10 moves along the direction of its axis as indicated by arrow 24. The cylindrical rollers 12, 14 rotate in the directions indicated by arrows 26 and 28 (FIG. 1).

The rollers 12, 14 are immediately adjacent one another with their curved surfaces 30 close to one another. To accommodate the shaft 10, each roller has a groove 32 in its curved surface 30 defining one half of the cross section of the closed shaft. Thus, when viewed along the axis of the shaft as in FIG. 2, a substantially circular recess accommodates and forces closed the shaft to allow the opposed edges 20 to be welded to one another.

Because there is a demand for tapered shafts, it will be clear that the area of this circular recess must increase to accommodate the increasing diameter of the shaft as the shaft is fed through (assuming that the shaft is fed from the narrow end or tip to the wide end or butt). This in turn means that the groove 32 in the curved cylindrical surface 30 of each roller 12, 14 must become progressively bigger around the circumference of the cylinder. As the roller rotates when the shaft is fed through, the recess between the opposed grooves increases to accommodate the increasing taper. Thus, it can be seen in FIG. 2, that the grooves 32 at the points of the rollers 12, 14 farthest from one another are substantially bigger than at the points closest together.

In order to maintain sufficient force to close the seam of the open shaft, the rotation of the cylinders is retarded. Otherwise, the tapered shaft would simply spin the rollers to a point where the taper of the shaft is easily accommodated by the increasing recess between the grooves.

Once the shaft has been fed between the rollers, it is gripped at a pair of grip holes 34 (FIG. 1) by a pair of jaws (not shown) which are mounted on a driven carriage. The carriage is driven away from the rollers along the direction of arrow 24 to pull the shaft through the rollers. A large force must be generated to pull the shaft through the rollers to overcome the retarding force on the rollers. This force increases as the taper of the shaft increases, because the amount of force required to close a large diameter shaft is greater than that required to close a small diameter shaft. To provide sufficient structural strength at the tip of the shaft, the grip holes 34 must be spaced from the tip of the shaft by a sufficient distance x (FIG. 1) to prevent the jaws ripping through the metal between the holes 34 and the tip.

Electrical resistance welding is accomplished by applying a current along the opposed edges 20 in the zone 18, such that at the point where the edges meet, the metal melts and a join is created. The shaft must however be fed through the rollers to the point where the jaws can grip the grip holes 34 (as in FIG. 1) before continuous welding can begin. This necessarily means that there is a significant length of unusable shaft near the tip which must be cut away from the finished shaft.

The rollers 12, 14 must be made of hardened steel (or other similar hardened material, in order to generate the required closing forces consistently. They are machined from a single mass of steel and then undergo heating and cooling to achieve the correct hardness. Such rollers are very difficult to manufacture correctly due to their scale.

The hardening process requires that a very large mass of steel be machined, and then heated and cooled uniformly without cracking. One commonly experiences failure rates of 50% in manufacturing these rollers, which means that the cost of successfully manufacturing rollers is increased far above the already high cost involved in machining and tempering a steel roller of these dimensions.

The use of these rollers also has a disadvantage in that one reaches an upper limit as to the size of the roller which can be realistically made, and therefore in turn, the size of the shaft which can be made using the process of welding closed an open shaft which is closed by pressure rollers.

Yet a further disadvantage is that any particular set of rollers is confined to manufacturing a single type of pole or shaft. One cannot make a pole having different taper characteristics without designing and manufacturing a new set of rollers. Therefore the process lacks the versatility required to be able to carry out small orders, since the high cost of the rollers must be factored into the cost per shaft, and the time involved in designing and manufacturing the rollers prevents manufacturing new shapes of shaft at short notice.

SUMMARY OF THE INVENTION

The invention provides a method of welding a shaft having an open seam defined between opposed longitudinal edges, comprising the steps of closing the seam of the shaft by applying inwardly directed radial forces to the shaft and welding the seam while closed by said forces.

The invention also provides a welding apparatus comprising means for welding a shaft having an open seam defined between opposed longitudinal edges, said apparatus comprising means for applying inwardly directed radial forces to the shaft, and welding means for welding the seam while closed by said forces.

Preferably, the inwardly directed radial forces are applied at a plurality of discrete points on the shaft surface.

Preferably, the welding means comprises an electrical resistance welding arrangement.

Further, preferably, the means for applying inwardly directed radial forces to the shaft at a plurality of discrete points on the surface of the shaft comprises a plurality of pressure rollers defining an opening through which the shaft is fed, and means for varying the positions of the rollers to thereby vary the dimensions of the opening.

Optionally, a number of sets of rollers, each set defining an opening, may be provided, with the shaft passing progressively through each opening in turn.

Preferably the apparatus further comprises feeding means for moving an open shaft through said means for applying inwardly directed radial forces, whereby the open shaft is progressively closed and welded along its length.

BRIEF DESCRIPTION OF THE DRAWINGS

The invention will now be further illustrated by the following description of an embodiment thereof given by way of example only with reference to the accompanying drawings in which.

DETAILED DESCRIPTION OF THE PREFERRED EMBODIMENTS

Figure 3:
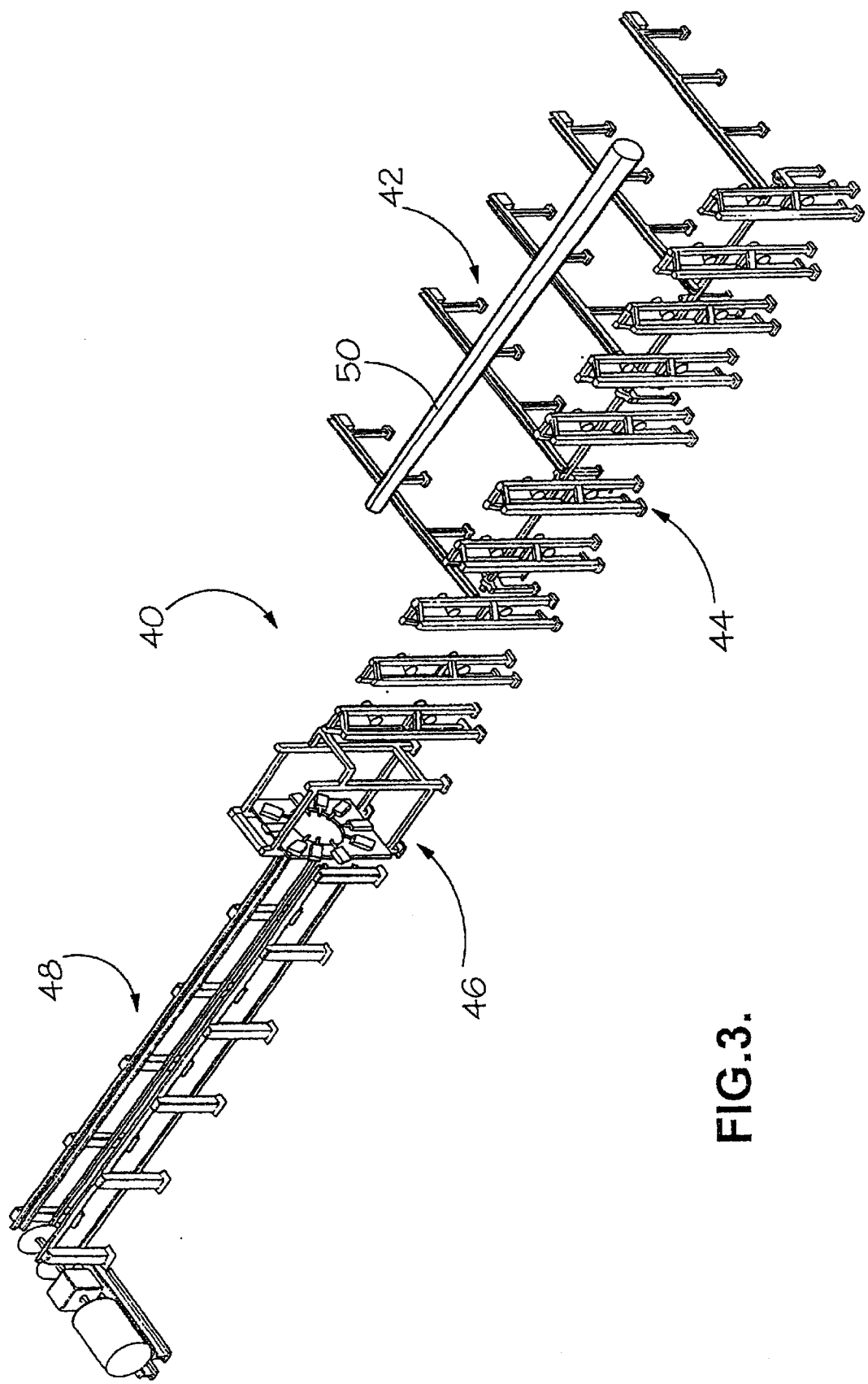
FIG. 3 is a perspective view of an apparatus according to the present invention showing a shaft as it begins to move through the apparatus.

In FIG. 3, there is indicated generally at 40 an apparatus according to the present invention, comprising the following main assemblies: a transfer table 42, an inlet table 44, a center section 46 and an outlet table 48.

The transfer table 42 is used to hold a number of shafts to be welded, and to load these shafts in turn onto the inlet table 44. One such shaft 50 is shown in position on the transfer table 42.

Figure 4:
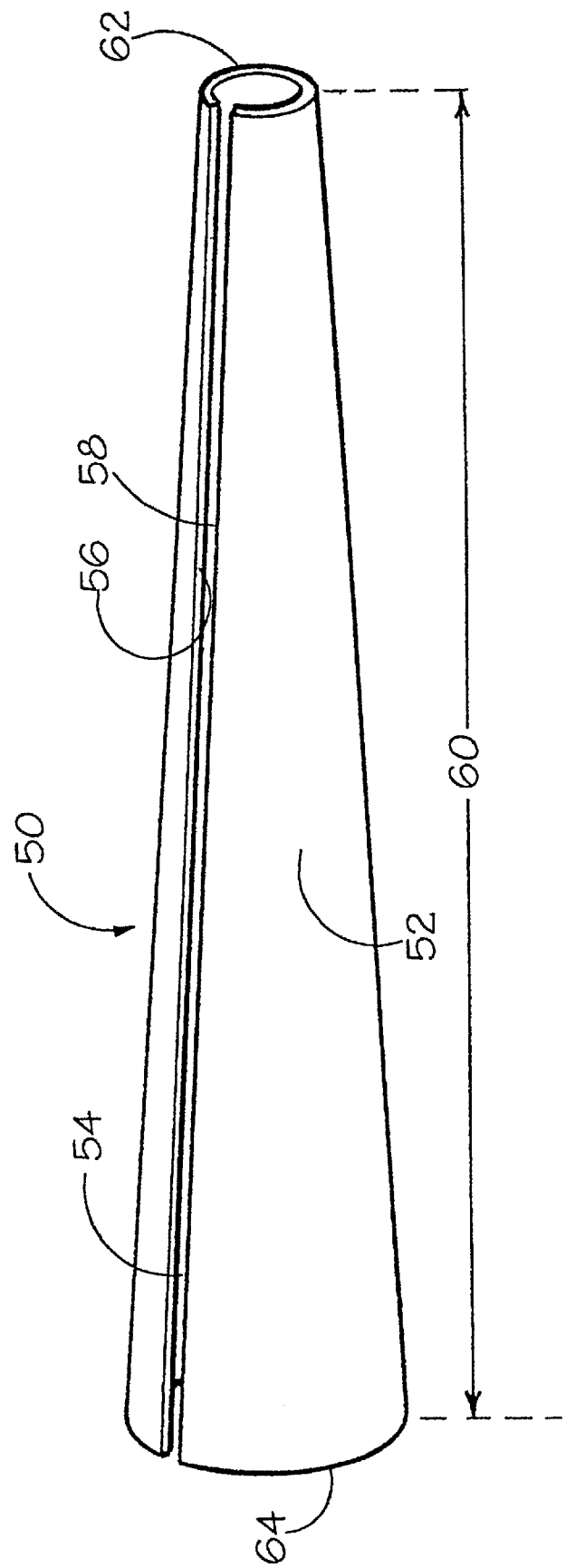
FIG. 4 is a perspective view of an open shaft before it is welded by the apparatus of the present invention.

FIG. 4 shows an open shaft 50 in perspective. The shaft 50 comprises a sheet 52 of material which has been formed into a generally closed cylindrical shape having an open seam 54 defined between opposed edges 56, 58.

In order to form the open shaft 50, a section of sheet steel is cut from a roll of sheet steel into a trapezoidal shape, the dimensions of which define the length 60 of the shaft, the diameters of the tip 62 and butt 64 of the shaft 50, and hence the degree of taper of the shaft 50.

The trapezoid is formed into the closed cylindrical shape by a series of stamping operations between male and female stamping members, as is known in the art.

In order to manufacture a closed shaft or pole from the open shaft 50, the apparatus 40 must force closed the seam 54 and weld the opposed edges 56, 58 together.

Figure 5:
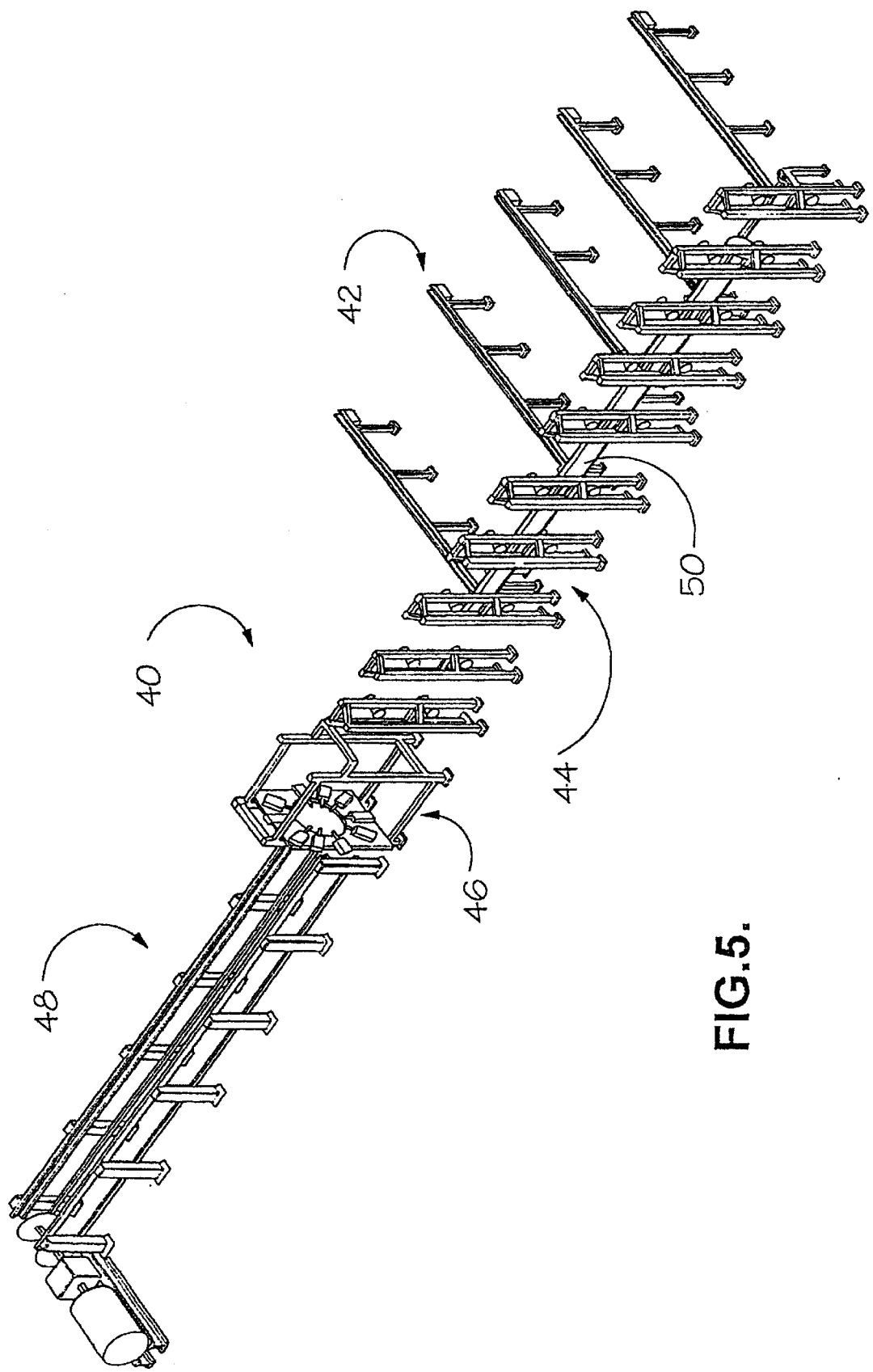
FIGS. 5–9 are perspective views similar to that of FIG. 3, showing the shaft at successive stages as it moves through the apparatus of FIG. 3.

FIG. 5 shows the shaft 50 when it has been loaded onto the inlet table 44. The inlet table rotates the shaft until the seam is uppermost and then transports the shaft, tip first, in this orientation towards the center section 46.

Figure 6:
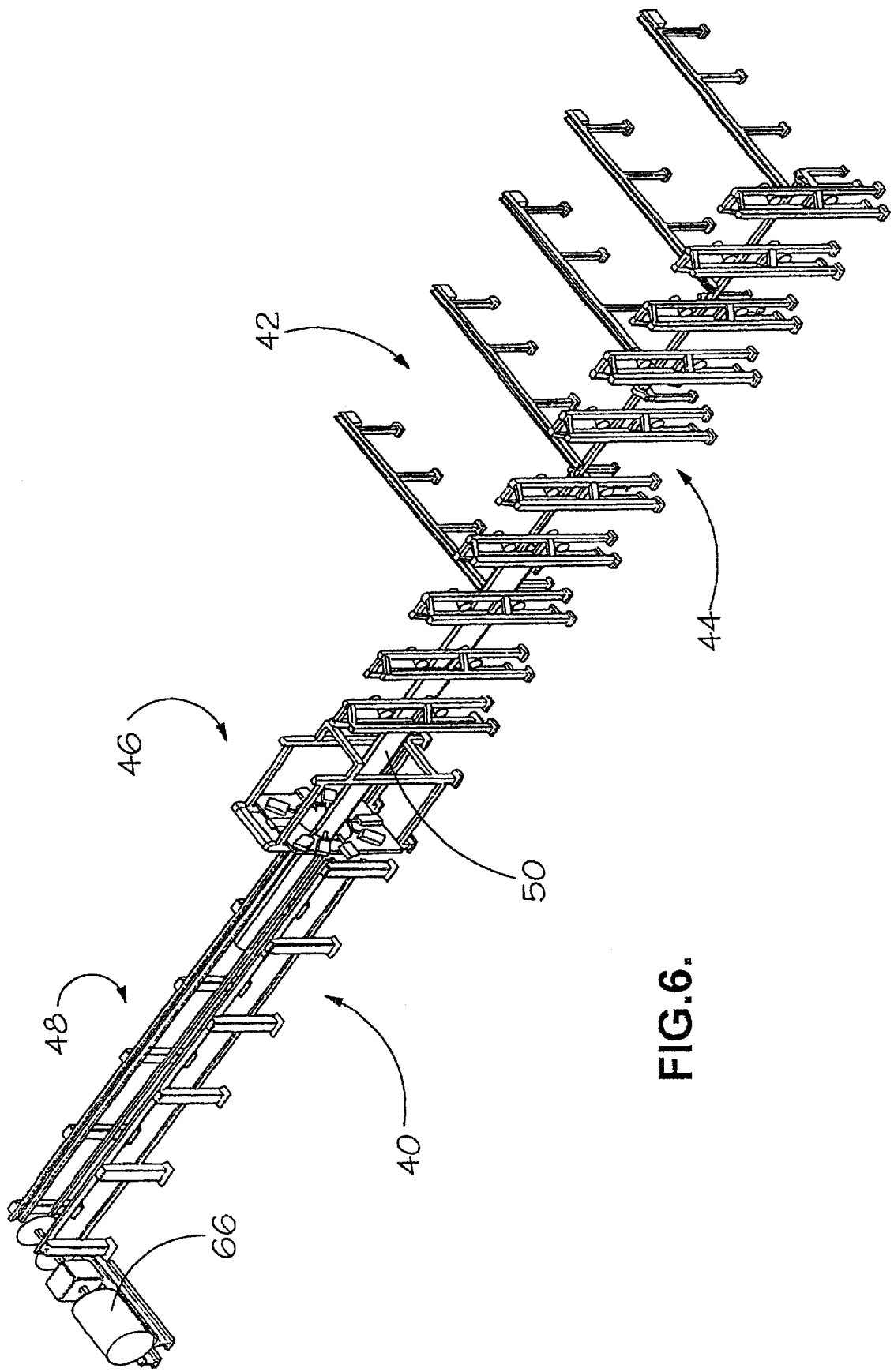

When the shaft 50 is in the center section 46 (FIG. 6), the seam is closed and the opposed edges are welded together as the shaft moves continuously through the center section towards the outlet table 48.

Figure 7:
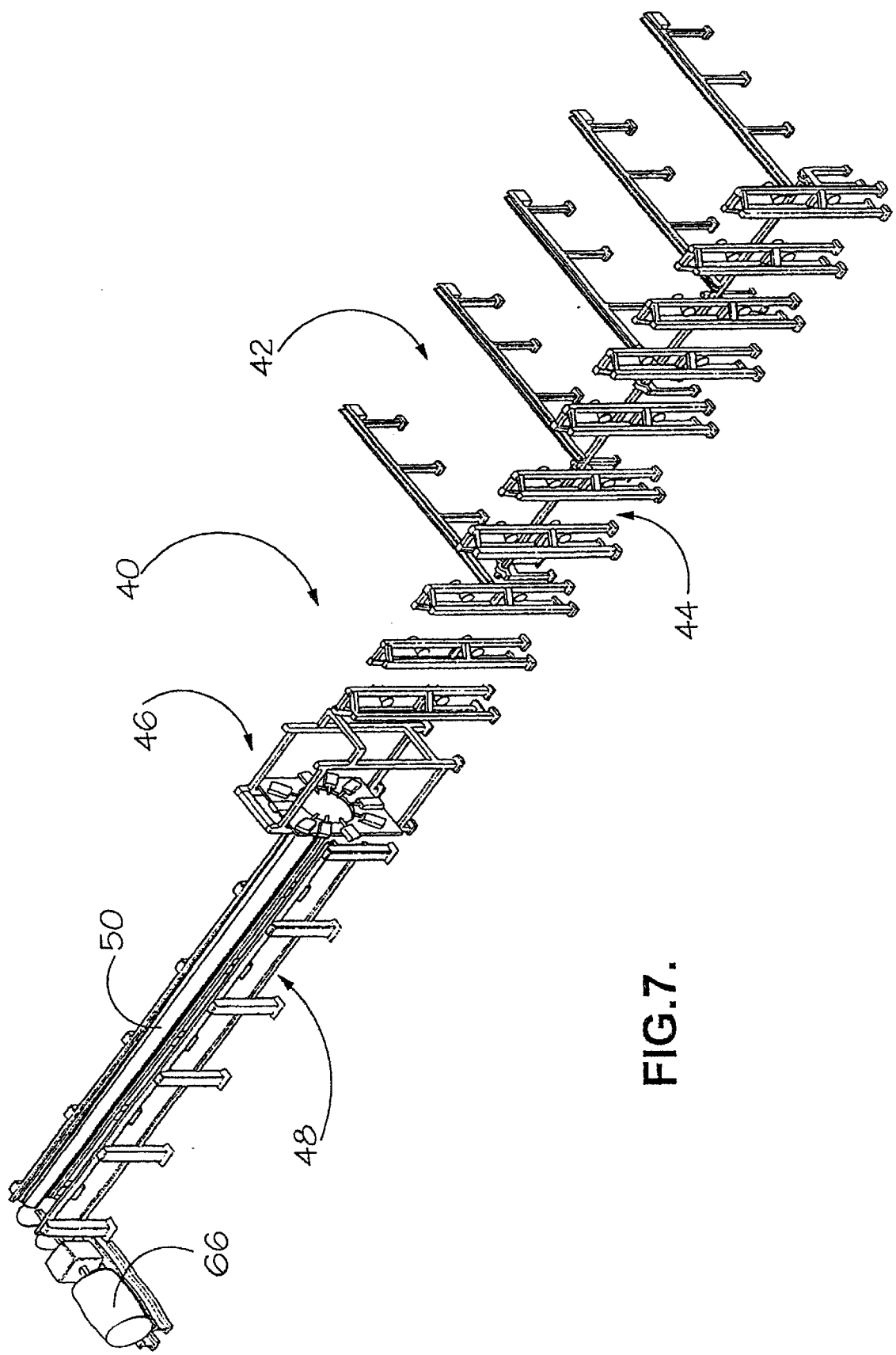

The outlet table 48 has a drive motor 66 which drives a drawbench (not shown) to pull the tip of the shaft away from the center section. As the shaft moves into the outlet table (FIGS. 6 and 7), the seam is welded progressively closed until the closed shaft is located entirely in the outlet table (FIG. 7).

Figure 8:
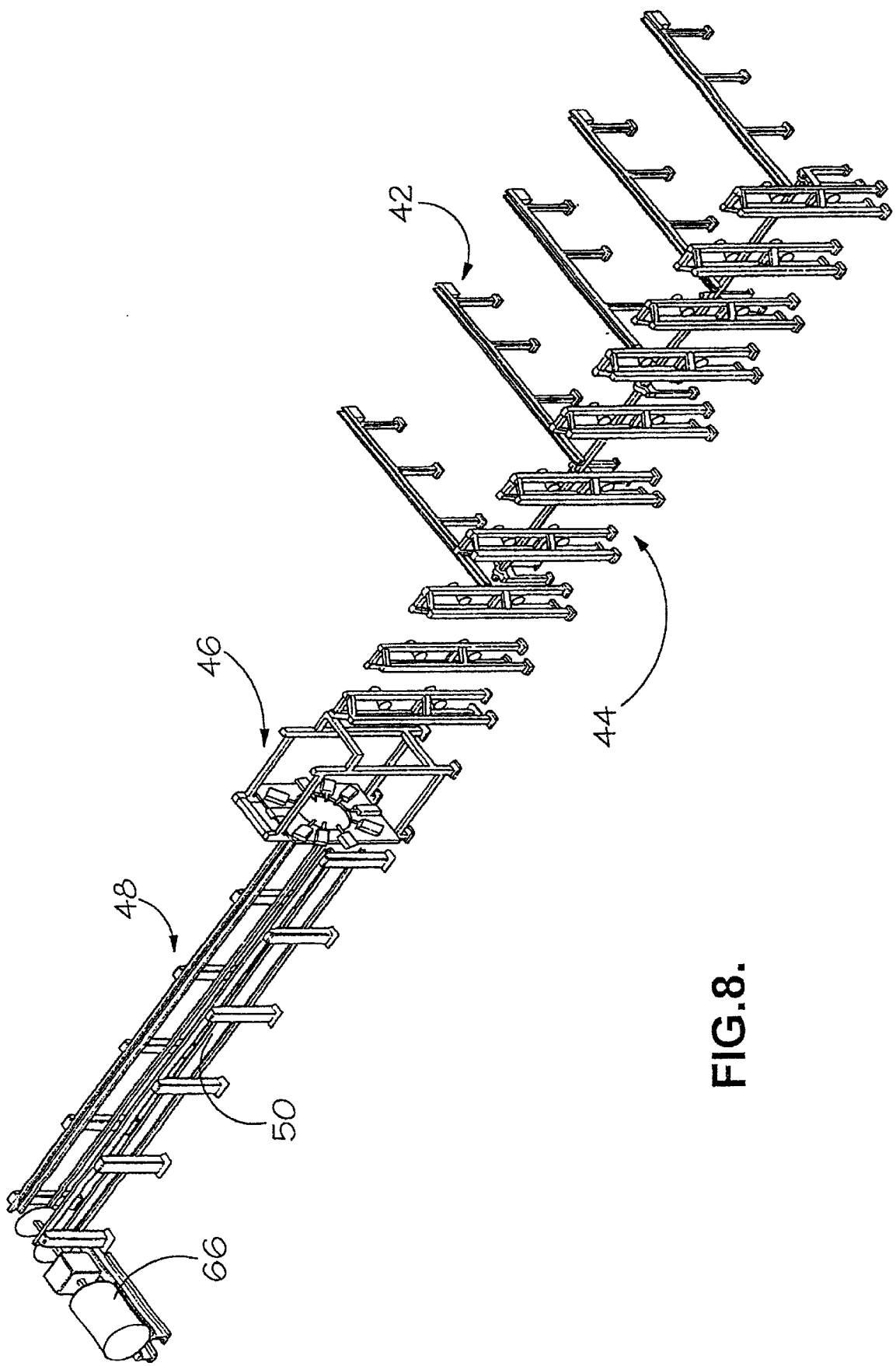
Figure 9:
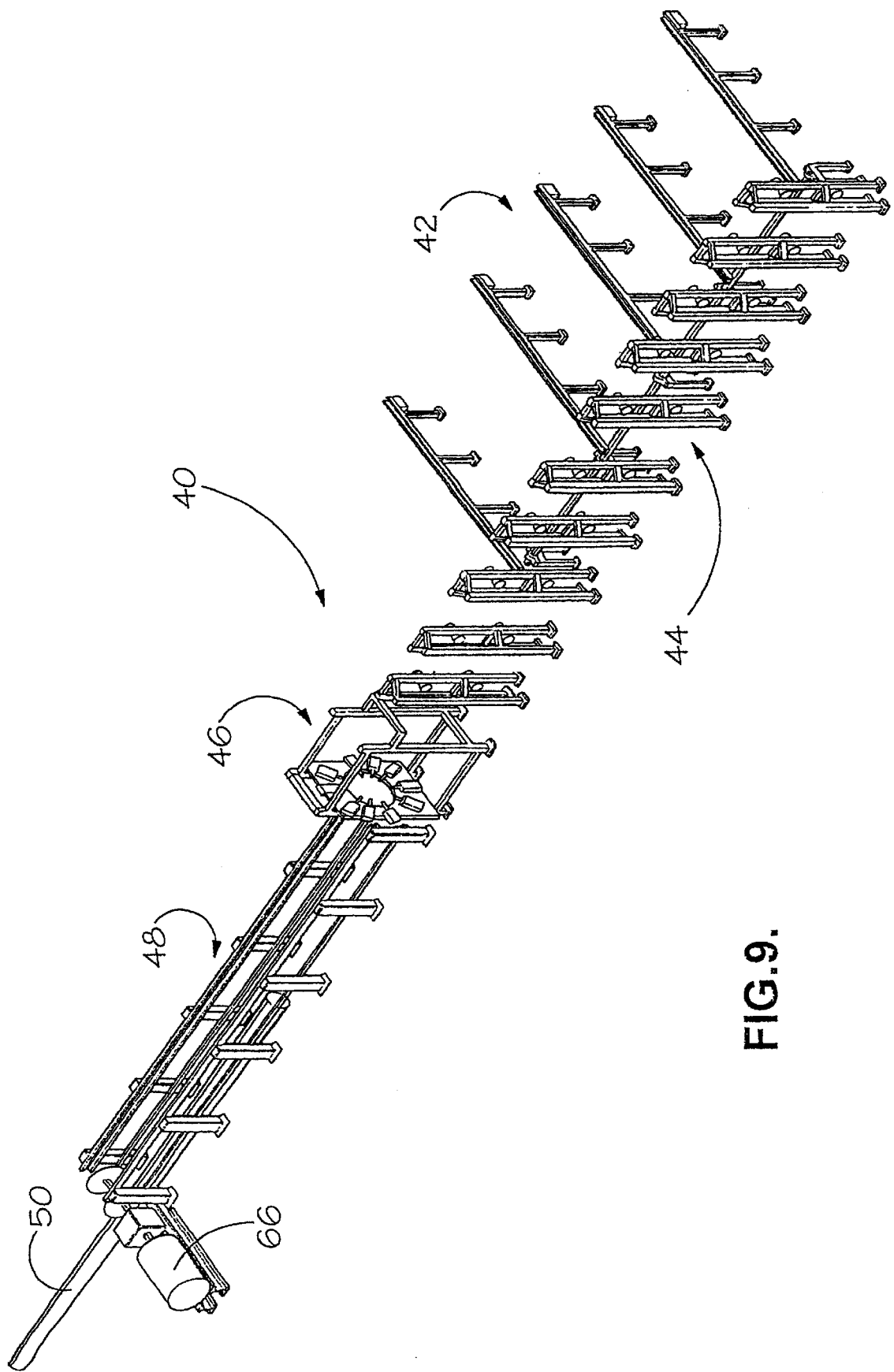

The drawbench then disengages from the shaft, and the shaft is lowered within the outlet section (FIG. 8) to allow the drawbench to move forward to engage the tip of the next shaft, and finally, the shaft is driven out of the outlet table (FIG. 9) for further operations the nature of which will be determined by the final use of the shaft.

Each of the main assemblies will now be described in greater detail.

Figure 11:
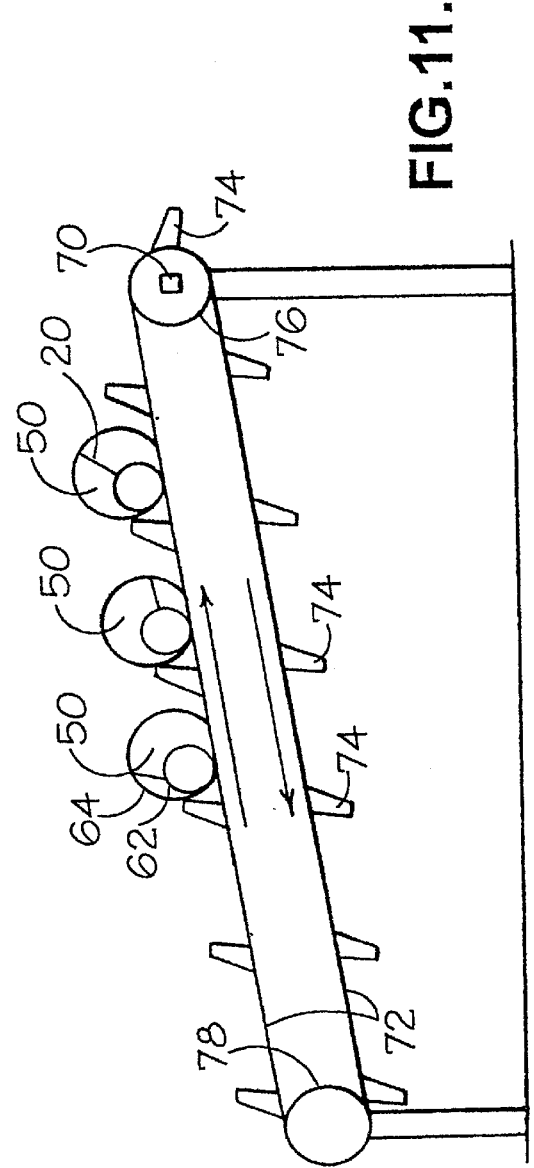
FIG. 11 is a side elevation of a conveyor of the transfer table of the apparatus of FIG. 3.
Figure 10:
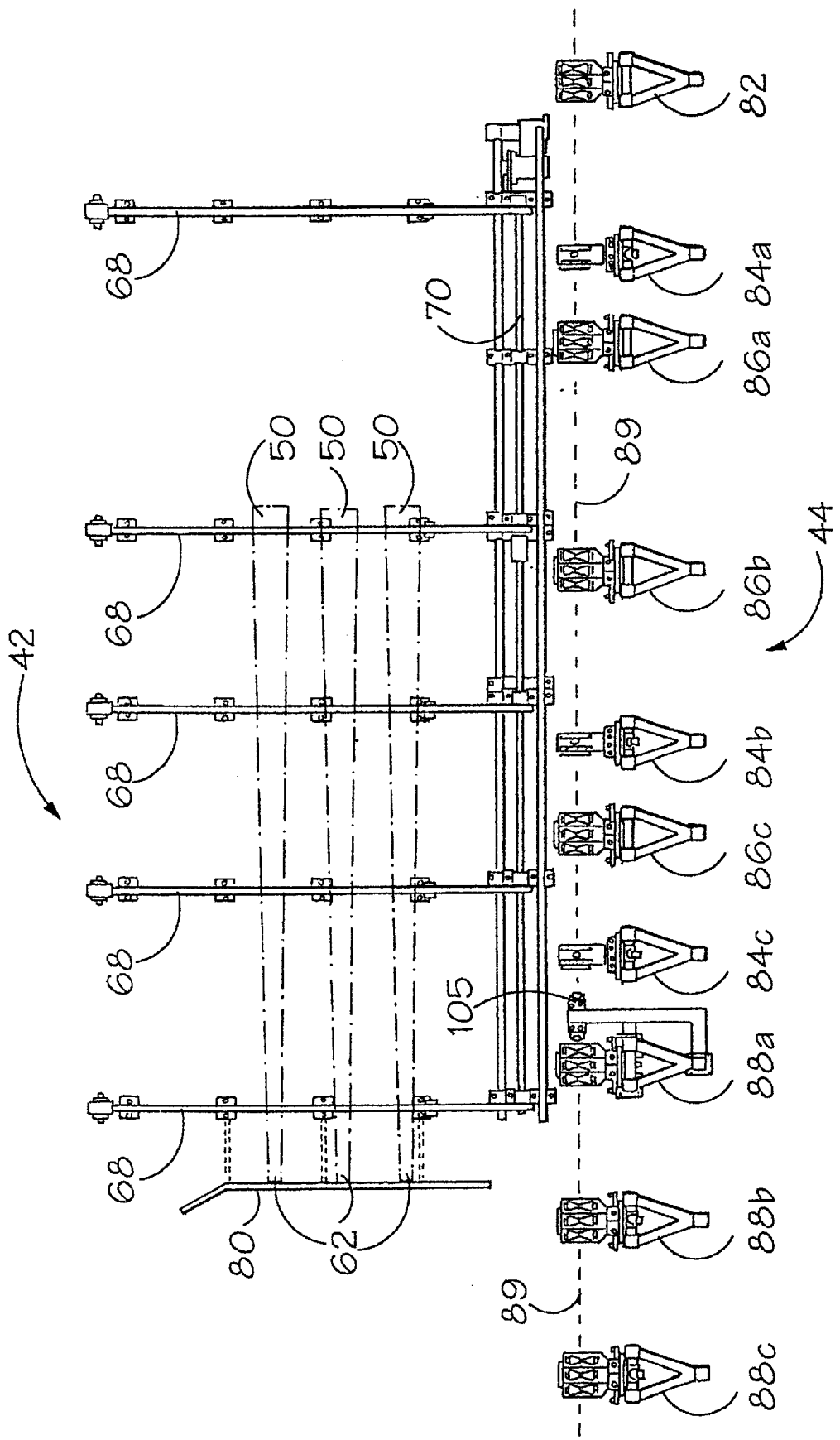
FIG. 10 is a plan view of the transfer table and inlet table of the apparatus of FIG. 3.
Figure 13:
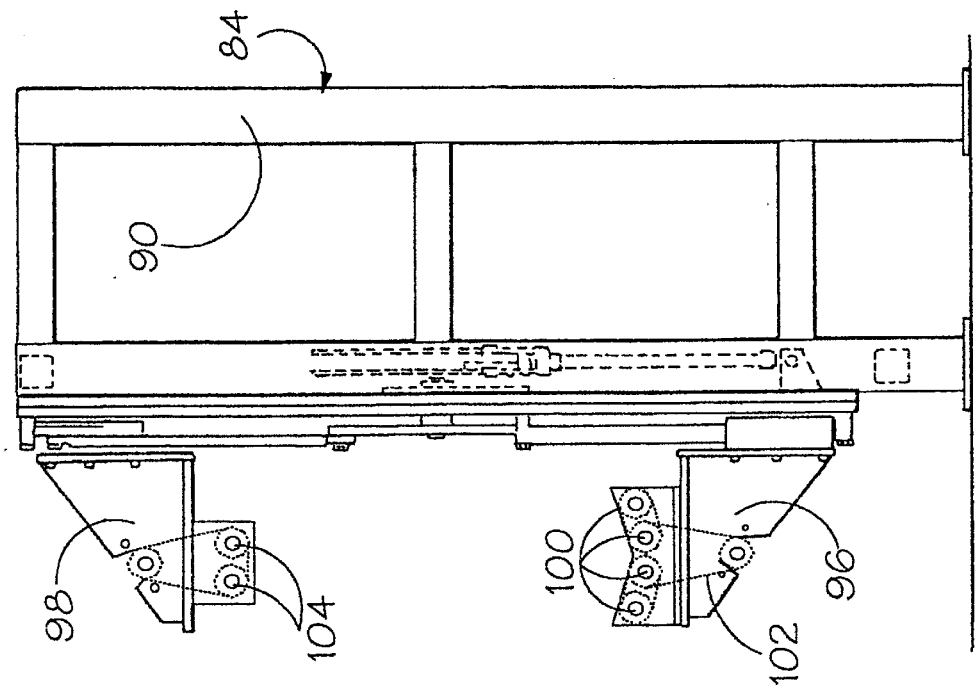
FIGS. 12–15 are side elevations of different stations of the inlet table of the apparatus of FIG. 3.

FIG. 10 shows the transfer table 42 with three shafts 50 loaded thereon. The transfer table has five roller chain conveyors 68 driven from a common shaft 70. One such conveyor is shown in a simplified side elevation in FIG. 11. The conveyor 68 comprises a chain 72 having a number of locator pegs 74 which support the shafts 50. In FIG. 11 the tip 62 and butt 64 of one of the shafts 50 are identified, as is the open seam 20 of one of the other shafts.

Chain 72 is mounted on a pair of sprocket wheels 76, 78. When the common drive shaft 70 is rotated, the shafts 50 are carried up the transfer table towards the drive shaft 70. Upon reaching the end of the table, the shafts are deposited on the inlet table 44, which is shown in FIG. 10 as a series of stations, described in further detail below.

In FIG. 10 it can be seen that the three illustrated shafts rest only on four of the five conveyors 68. The fifth conveyor is provided to support longer shafts. The transfer table is provided with a locating beam 80 to align the tips 62 of the shafts and ensure that the shafts are deposited at the correct position along the inlet table 44.

FIG. 10 shows the positions of the inlet table 44 as a series of stations 82, 84a–84c, 86a–86c, 88a–88c located along a datum line 89 perpendicular to the conveyors 68. The inlet table consists of four different types of stations which together support the shaft, orient it to a position where the seam is uppermost, and drive it towards the center section. The four different types of station are defined by the types of rollers on which the shaft is supported.

The first station (starting at the end of the inlet table 44 farthest from the center section) is a non-powered support roller station 82 used to support the butts of long shafts.

The second, fifth and seventh stations are orientation roller stations 84a, 84b, 84c which are used to rotate the shaft about its axis until the seam is uppermost.

The third, fourth and sixth stations are powered seamless drive roller stations 86a, 86b, 86c which are used to drive the shaft forward towards the center section.

Finally, the eighth, ninth and tenth stations are powered seamguide drive roller stations 88a, 88b, 88c which are used to drive the shaft forward towards the center section while maintaining the seam uppermost.

The four station types can be seen in elevation along the direction of the shaft axis (not shown) in FIGS. 12–15.

Figure 12:
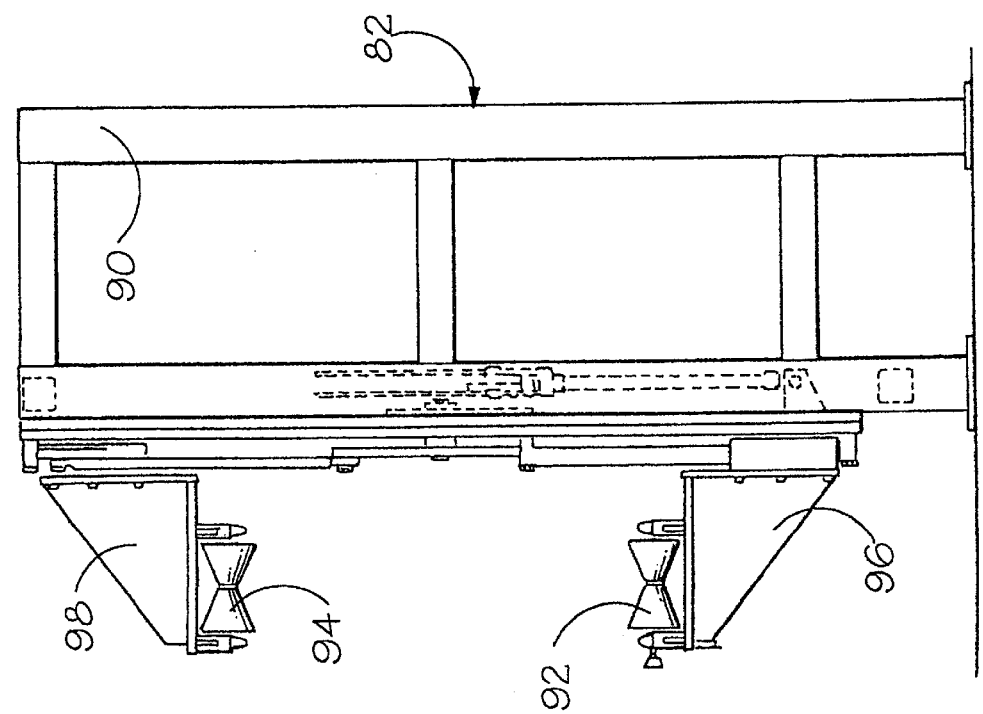

FIG. 12 shows the non-powered support roller station 82 which comprises a support frame 90 having a pair of lower rollers 92 (of which only the closest one is visible in FIG. 12) and a single upper roller 94. Each of the rollers 92, 94 is in the shape of a pair of abutting frusto-conical halves which define a shallow V-shaped support for the shaft. These rollers allow the shaft to be moved along the direction of its axis towards the center section.

The lower and upper rollers 92, 94 are mounted on a lower roller support assembly 96 and an upper roller support assembly 98, respectively, which are hydraulically driveable in a vertical direction to open and close the spacing between the rollers 92, 94.

All of the other stations similarly have a support frame 90 and lower and upper roller support assemblies 96, 98 (on which different roller types are mounted), such that each of the ten stations can be opened and closed independently of the other stations.

In the orientation roller stations 84 (FIG. 13), the lower roller support assembly 96 has four orientation rollers 100 driven by a drive chain 102. The orientation rollers 100 are mounted transversely to the rollers 92, 94 of the non-powered support roller station 82, i.e. the axes of the orientation rollers are parallel to the axis of the shaft. A pair of driven orientation rollers 104 are mounted on the upper roller support assembly of the station 84. Thus, when the shaft is supported solely on the orientation roller stations 84a, 84b, 84c, and the lower and upper roller support assemblies are brought together so that the shaft surface is contacted on its underside by rollers 100 and on its upper side by rollers 104, the rotation of these rollers 100, 104 causes the shaft to rotate about its own axis.

A proximity sensor array 105 (FIG. 10) is mounted on the support frame of station 88a to detect the seam of the shaft. When the proximity sensor detects that the seam is at the uppermost point of the shaft circumference, the orientation rollers are stopped to maintain the correct orientation of the shaft.

Figure 14:
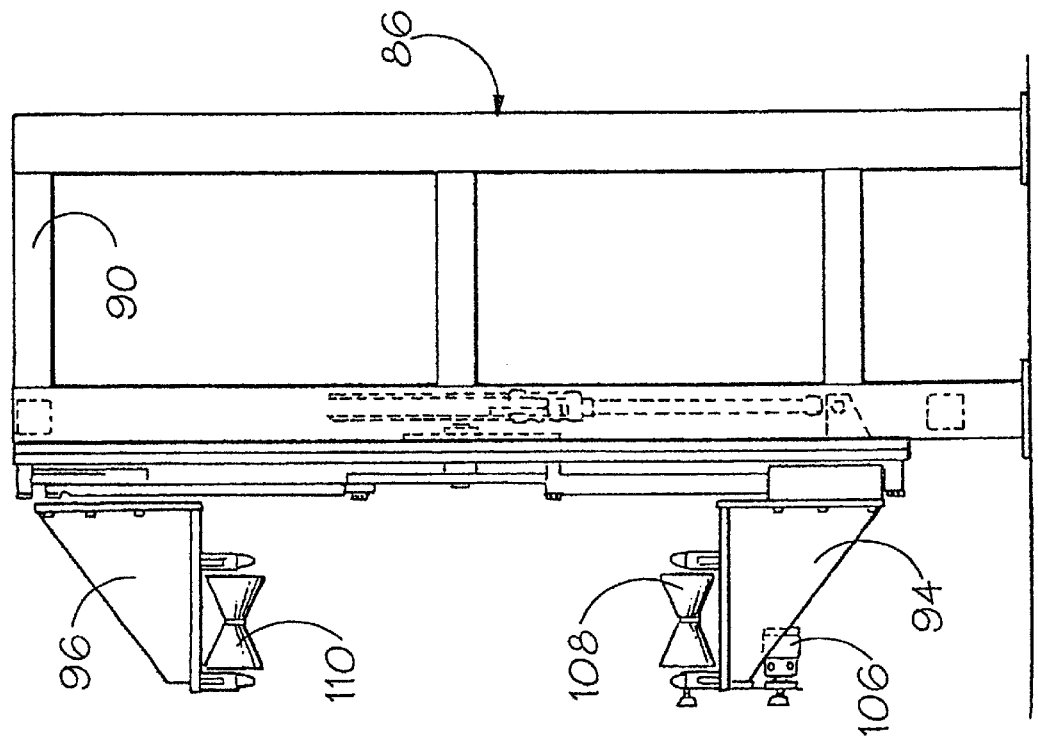

FIG. 14 shows the powered seamless drive roller stations 86 which are similar to the non-powered station 82 but which have a drive motor 106 on the lower roller support assembly 94 which drives the lower pair of rollers 108 (again, only the closer of the pair can be seen in FIG. 14). The upper roller 110 in this station is undriven.

Figure 15:
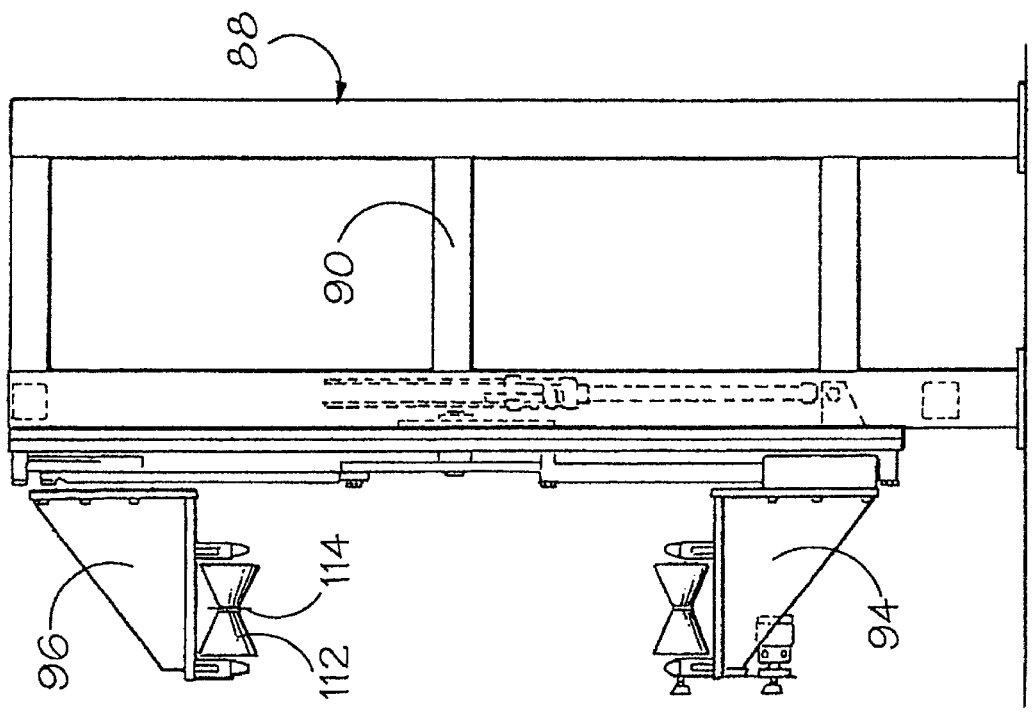

FIG. 15 shows the powered seamguide drive roller stations 88 which are identical to the seamless drive roller stations 86 of FIG. 14 except that the upper roller 112 in FIG. 15 has a seamguide 114 extending from its center. When the orientation rollers 100, 104 (FIG. 13) have placed the seam of the shaft uppermost and the lower and upper roller support assemblies 96, 98 of station 88a are brought together to engage the shaft, seamguide 114 sits into the seam of the shaft and prevents the shaft from rotating on its axis as it is driven forward towards the center section. The two other powered seamguide drive roller stations 88b, 88c also subsequently engage the shaft in the same manner. This ensures that the welding electrodes are correctly located relative to the seam in the center section, as will be described below.

The operation of the inlet table is as follows. A set of sensors determines that the stations are correctly open to receive a shaft. In a continuous operation, each station will open as the butt of a shaft clears the rollers of that station, and for shafts of the length shown in FIG. 3, it is necessary therefore only for the fourth to eighth stations 84b, 84c, 86b, 86c, 88a to be open for a shaft to be loaded. The preceding shaft can still be in the process of being driven forward by the ninth and tenth stations 88b, 88c when the sensors determine that the inlet table is ready to receive the next shaft. Obviously for longer shafts, the first, second and third stations may also have to be open.

The shaft is deposited onto the lower sets of rollers of the open stations. The lower and upper roller support assemblies 96, 98 of the orientation roller stations 84 are then hydraulically driven together to grip the shaft. As the lower support assemblies 94 are driven upwards to meet the descending upper support assemblies 96, the shaft is raised to approximately the datum position.

In the datum position the shaft is held horizontally with its axis pointing directly along the line of the inlet table. In other words the datum line for all of the translation and rotational movements is the central axis of the shaft (and not the line of the seam which is at an angle to the central axis as determined by the taper).

A pneumatic cylinder lowers the proximity sensor array 105 close to the upper surface of the shaft. The orientation rollers 100, 104 are then rotated to spin the shaft about its longitudinal axis until the proximity sensor array 105 determines that the seam is uppermost. A seamguide (not shown) mounted adjacent to the proximity sensor array is lowered into the seam to prevent rotational slippage.

Once the seam is uppermost, the powered drive roller support assemblies 96, 98 of stations 86b, 86c, 88a are brought together to engage the shaft from above and below, with the seamguide 114 of station 88a locating into the seam of the shaft. The orientation roller stations are then opened and return to their start positions. The sensor array 105 and the associated seamguide which was initially lowered to prevent slippage may also be withdrawn, as the seamguide 114 of station 88a will now hold the seam uppermost.

The hydraulic cylinders which drive the upper and lower roller support assemblies 96, 98 of the powered drive roller stations 86b, 86c, 88a then operate to precisely position the central axis of the shaft along the datum line. Once the shaft is accurately located, the hydraulic pressure on the roller support assemblies is relaxed so as to firmly support the shaft without gripping the shaft so tightly that frictional forces impede the translational movement of the shaft towards the center station.

The shaft, once located, is then driven forward by the powered lower rollers of the powered drive stations 86b, 86c, 88a until the tip enters the center section. Because of the inertia of a large shaft, the rollers are driven to accelerate and decelerate the shaft smoothly into the center section 44, with sensors in the center section detecting the approach and correct positioning of the tip of the shaft to begin welding.

As the shaft is driven forward, the lower and upper roller support assemblies of each of the inlet table stations move apart at a rate determined by the taper of the shaft. Stations 88b and 88c are set to engage the shaft as it enters these stations and to similarly move apart while driving the shaft forward.

As indicated above, when the butt of the shaft passes through each individual station, the lower and upper roller support assemblies of that station are fully opened to await the next shaft.

Figure 16:
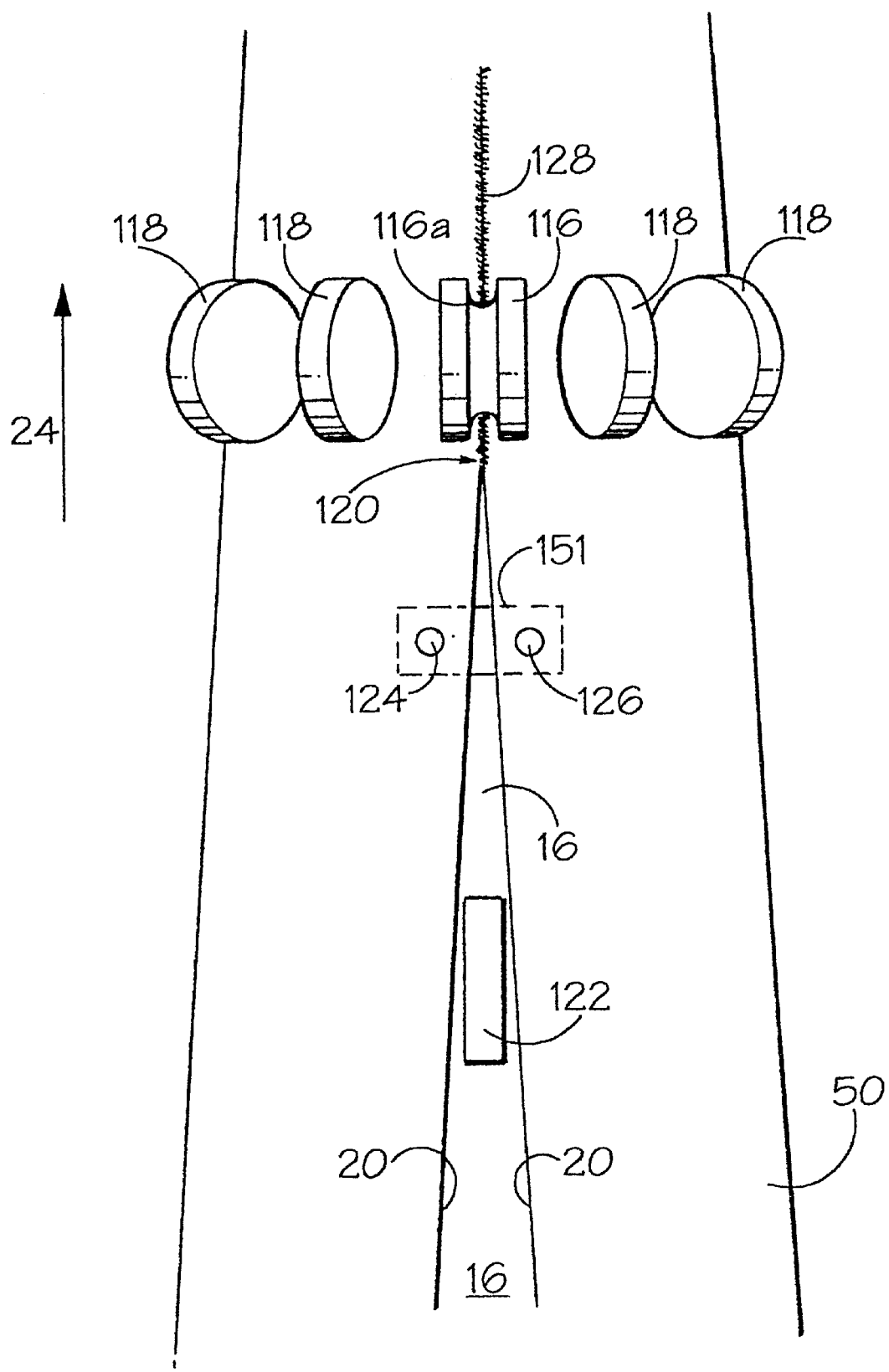
FIG. 16 is a schematic plan view of a detail of a shaft being welded by the apparatus of FIG. 3.

The welding process is an electrical resistance welding process in the described embodiment (although other welding techniques could be used as appropriate). FIG. 16 schematically illustrates the primary components of the center section used in the electrical resistance welding process.

Figure 17:
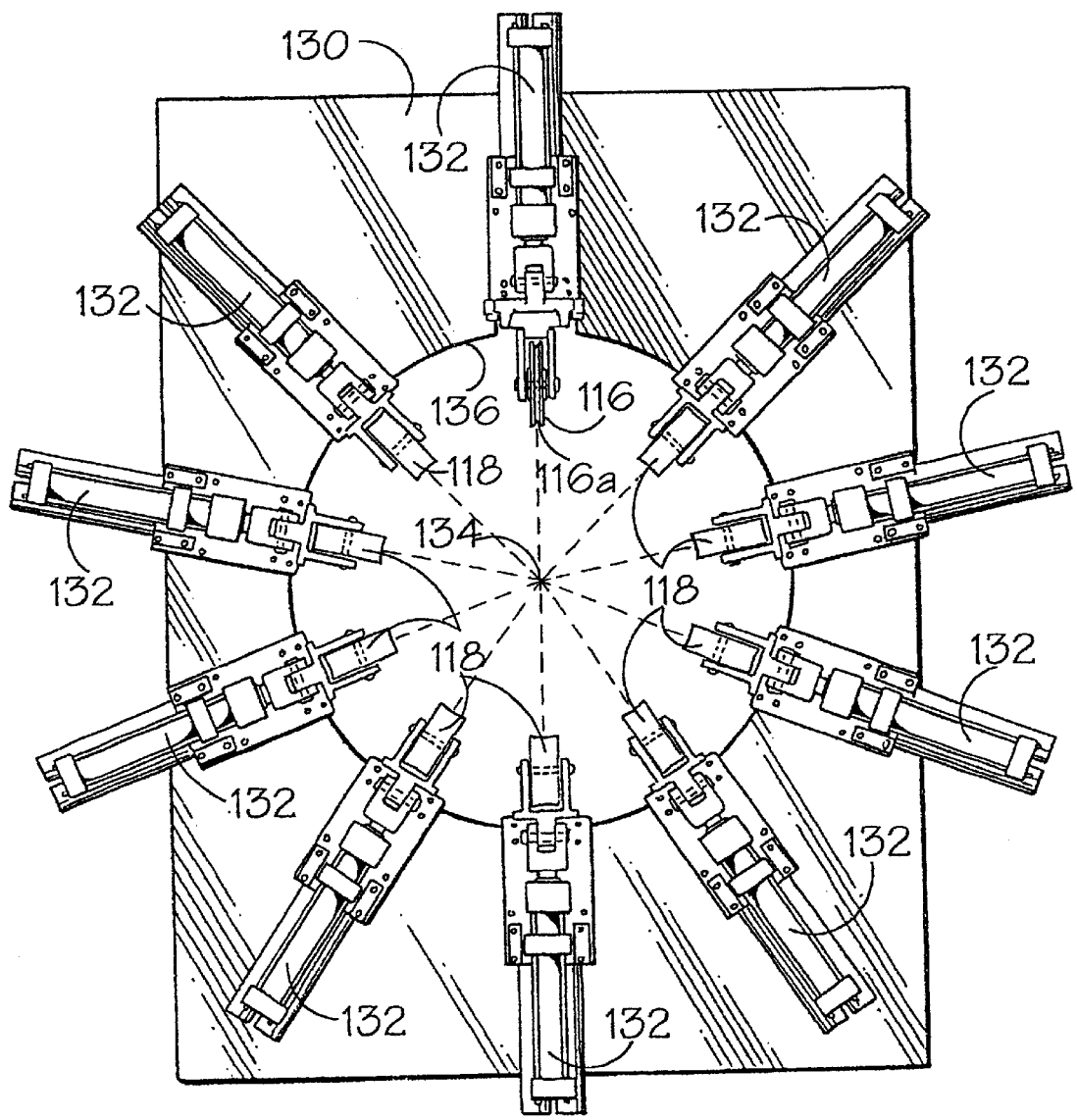
FIG. 17 is a front elevation of the center plate and pressure rollers of the apparatus of FIG. 3.
Figure 18:
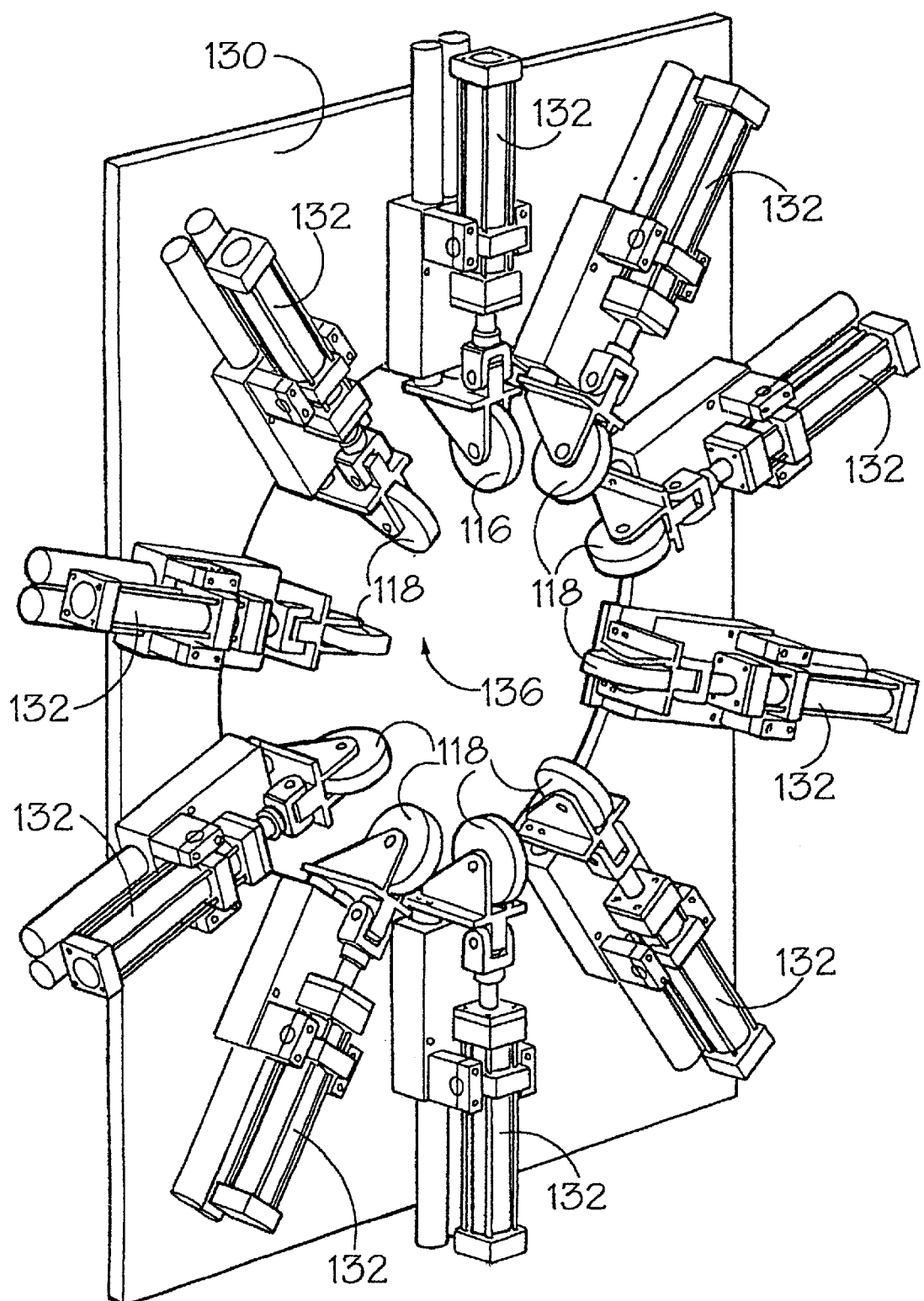
FIG. 18 is a perspective view of the center plate and pressure rollers of the apparatus of FIG. 3.

In FIG. 16, the shaft 50 is seen from above. An open seam 16 defined between opposed edges 20 is forced closed as the shaft moves in the direction of arrow 24 through an array of pressure rollers 116, 118, which are represented schematically in FIG. 16. The array of rollers can be seen in greater detail in the end elevation of FIG. 17 and in the perspective view of FIG. 18.

The pressure rollers 116, 118 are hydraulically operated to generate an inwardly directed radial force on the outer surface of the shaft. This compressive force causes the opposed edges to be forced into contact at a welding point indicated at 120. Thus, immediately upstream (in the direction of the inlet table, opposite to that of arrow 24), the opposed edges form an acute "V" shape.

A finpass 122 sits within the open seam upstream of the welding point to maintain the "V" open by at least a predetermined amount, which will be dependent on the welding parameters and the properties of the steel or other material being welded. If necessary, one or more additional arrays of pressure rollers and/or finpasses may be provided to correctly close the seam at the required angle, and to exert additional closing force where required.

A pair of welding electrodes 124, 126 contact the outer surface of the shaft adjacent the opposed edges 20 in the vicinity of the "V" between the finpass 122 and the welding point 120. The welding electrodes are connected to a high frequency, low voltage, high current power supply.

The high current is applied by the electrodes to the edge portions of the shaft, where it preferentially flows along one edge, through the point of contact (welding point 120) and back along the other edge. The localized resistance at the welding point causes the temperature to rise above the melting point of the material, and the contacting edges become molten and fuse together.

For shafts of smaller diameter (or at the tip end of tapered shafts), the current may tend to flow circumferentially around the shaft between the contacts, rather than along the "V" edges. In such cases, an impeder (not shown) may be located on an arm extending from the finpass mounting down through the open seam of the shaft, i.e. inside the hollow open shaft. The impeder is a generally cylindrical body which extends forward of the finpass to a point generally below the welding electrodes, and is filled with ferrite rods. These rods act to counteract the induced field around the circumference of the shaft, inhibiting current flow away from the circumference and thereby encouraging current flow along the "V" edges.

The weld is strengthened by the compressive force applied by the pressure rollers, so that the molten edges are pushed together to form a raised seam 128 above and below the surface of the shaft. The external (visible) part of this raised seam may be removed by a scarfer (not shown) while still soft, or it may be machined away at a later point in time. Preferably, a scarfer is located just downstream of the pressure roller 116.

It can be seen that roller 116 (FIGS. 16 and 17) has a stepped surface defining a recess 116a. This is to accommodate the still-molten seam as it passes under the roller.

The actual current applied will depend on the characteristics of the material being welded and the speed at which the shaft is moved past the electrodes. A pyrometer (not shown) located above the welding point 120 monitors the colour of the molten material (and hence the welding temperature) and the current is controlled to maintain a suitable welding temperature.

The sequence of steps from the point at which the tip of the shaft enters the center section is as follows. The position of the finpass (and impeder if present) is fixed to ensure that the finpass is correctly located to pass within the seam of the shaft as the tip enters the center section. As described above, the driving rollers of the inlet table accelerate and decelerate the shaft to correctly locate the tip inside the center section.

The shaft is stopped with the tip protruding downstream of a center plate 130 (seen from the upstream side in FIGS. 17 and 18) on which the pressure rollers 116, 118 are mounted, each via its own hydraulic cylinder 132. Each hydraulic cylinder 132 is independently actuable to move the associated pressure roller 116, 118 radially towards or away from the center 134 (FIG. 17) of an aperture 136 in the center plate 130.

Figure 19:
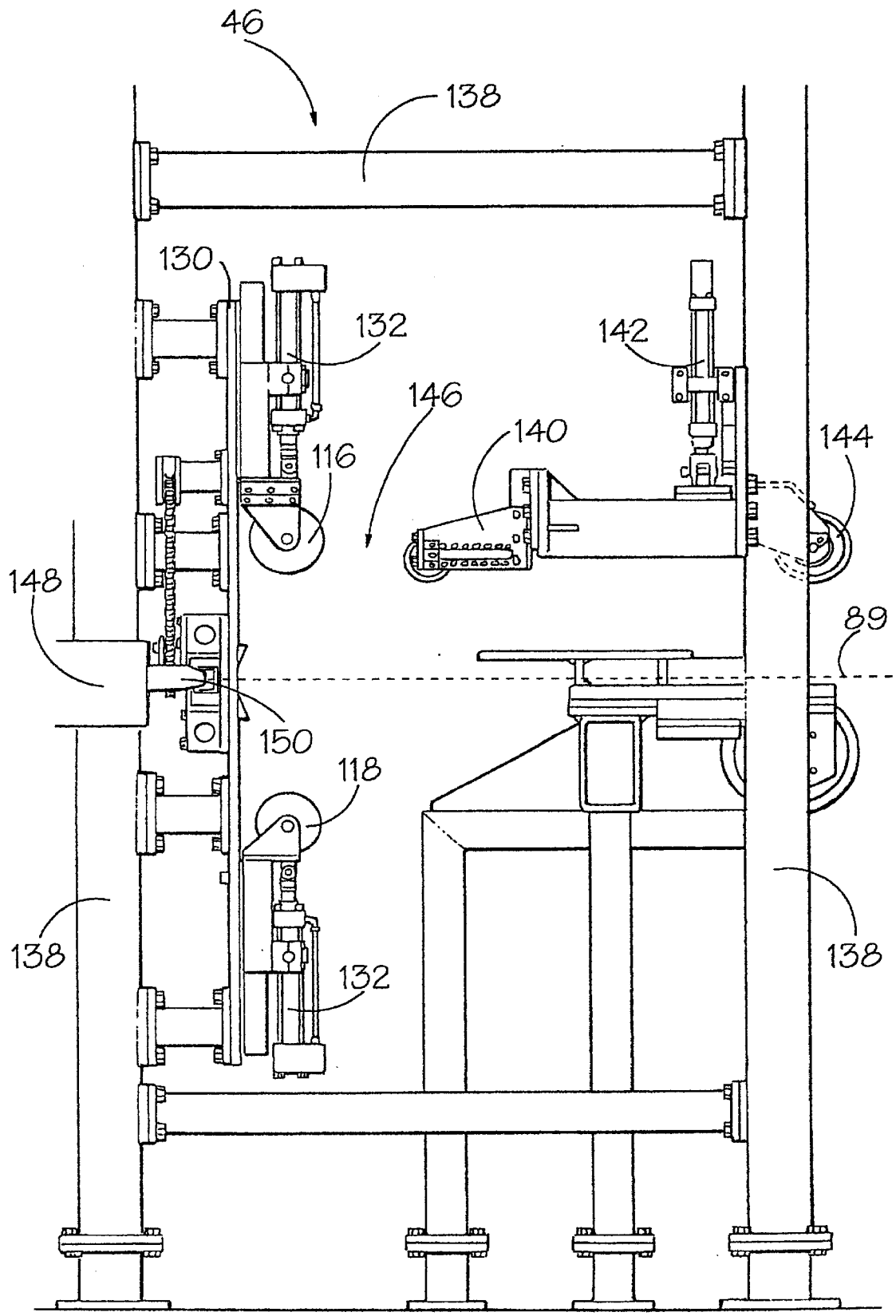
FIG. 19 is a side elevation of the center section of the apparatus of FIG. 3.

FIG. 19 shows the center section in side view, with some components omitted for clarity. A support frame 138 is used to mount the center plate 130, and on this center plate the vertically mounted pressure rollers 116, 118 can be seen spaced equidistantly from the datum line 89. FIG. 19 also shows the finpass assembly 140 on which the finpass 122 is mounted. The finpass assembly is hydraulically movable in a vertical direction by means of a hydraulic cylinder 142. A further finpass or seamguide 144 is mounted on the finpass assembly 140 in the direction of the inlet table.

The welding assembly and the impeder are omitted for clarity. The welding assembly lowers into a gap 146 between the finpass assembly 140 and the pressure cylinder 116.

A drawbench 148 (shown partially in FIG. 19) on the outlet table is equipped with a pair of jaws 150 which are actuable to grip a pair of grip holes located adjacent the tip of the shaft. The drawbench 148 moves along the outlet table towards the center section as the shaft enters the inlet table, and once the tip is correctly positioned, the jaws 150 engage the grip holes at a point just beyond the center plate 130.

Next, each of the pressure cylinders 118 (but not pressure cylinder 116) converges on the shaft to close the seam. The pressure exerted by the nine cylinders cause the meeting edges to be forced upwards, so that the shaft has a very slight "teardrop" cross section. Finally, pressure cylinder 116 descends to depress the meeting edges and provide a circular cross section.

The welding electrodes 124, 126 are provided on a welding assembly (shown schematically in FIG. 16 as a dotted outline 151 around the electrodes) which can be hydraulically raised and lowered. The welding assembly is held away from the shaft surface until the pressure cylinders 116, 118 have contacted and closed the shaft. Then the hydraulic cylinder brings the welding assembly down towards the surface of the shaft. The electrodes are pneumatically actuable to move a short distance relative to the welding assembly, so that welding contact can be made or broken substantially instantaneously without retracting the entire welding assembly.

When welding contact is made, cooling water is applied to the welding assembly and the current generator is sent a signal to apply a preheat current to the electrodes to preheat the welding area to an appropriate temperature, such as, for example, 800–850° C. A short time later (e.g. 1–2 seconds after application of preheat current), the vector drive motor 66 on the outlet table 48 (FIG. 6) powers up and begins to accelerate the drawbench, which is holding the tip of the shaft, away from the outlet table.

Simultaneously with the acceleration of the drawbench, full welding power is sent to the welding electrodes, thereby heating the welding point to full welding temperature (e.g. 1250–1350° C).

The vector drive motor is driven under computer control. The exact rotor position of the motor is monitored to determine the precise drawbench position relative to the center section. The computer is programmed with the taper characteristics of the shaft, and hence the shaft diameter at the pressure cylinder array, welding electrode position, finpass position, and each of the inlet table stations can be determined.

As the drawbench moves, the pressure cylinders are moved outwards at the precise rate required to maintain sufficient pressure to close the shaft, taking the taper into account. Similarly, the hydraulic cylinder controlling the welding assembly moves the welding electrodes upwards to keep contact on the shaft, and the finpass and impeder are likewise moved upwards at the appropriate rate to maintain their position relative to the seam of the shaft. The positions of the hydraulic cylinders controlling the roller support assemblies of the inlet table stations is also controlled by the computer and varied to account for the taper of the shaft.

The drawbench can typically be operated at speeds up to and in excess of 25 m/minute without compromising the weld quality.

When the butt of the shaft passes a predetermined point, welding power is removed and the drawbench continues to pull the shaft in its entirety onto the outlet table.

Figure 20:
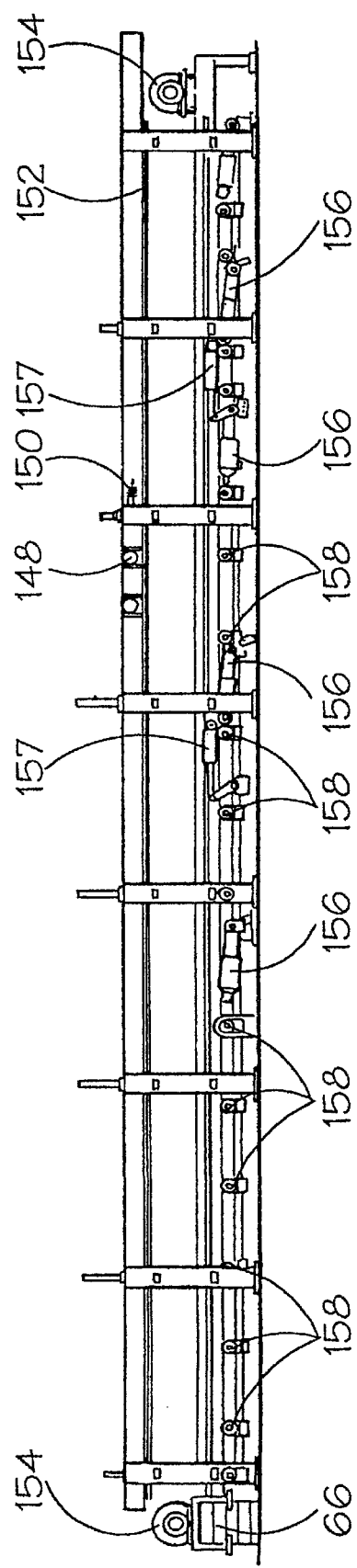
FIG. 20 is a side elevation of the outlet table of the apparatus of FIG. 3.

FIG. 20 shows the outlet table 48 in side elevation. The drawbench 148 (with its jaws 150 oriented towards the center section) moves along a track 152 under the influence of drive motor 66 which drives a chain (not shown) around a pair of chainwheels 154.

The jaws move along the datum line (not shown in FIG. 20), pulling the welded shaft (also not shown) directly away from the pressure rollers. As the butt of the shaft exits the pressure rollers of the center section, a number of cradle rollers 156 are hydraulically actuated by hydraulic cylinders 157 located within the outlet table to pivot upwards to meet the shaft which drops onto the cradle rollers.

The jaws 150 then disengage from the shaft and the cradle rollers 156 are lowered back down to the position shown in FIG. 20. Just before the cradle rollers are fully lowered, the shaft meets a set of driven rollers 158 at the base of the outlet table, and the shaft is thereby transferred onto the driven rollers (see also FIG. 8).

At this point, the motor 66 reverses to send the drawbench back to the outlet table in preparation for the next shaft. The driven rollers 158 then are actuated to transfer the shaft out of the end of the outlet table (in the manner indicated in FIG. 9) as the next shaft starts to be pulled forward by the drawbench. Because of the high speed at which the invention operates, the time taken from when the shaft is loaded onto the inlet table until it is lowered in the outlet table is of the order of 45 seconds.

Figure 21:
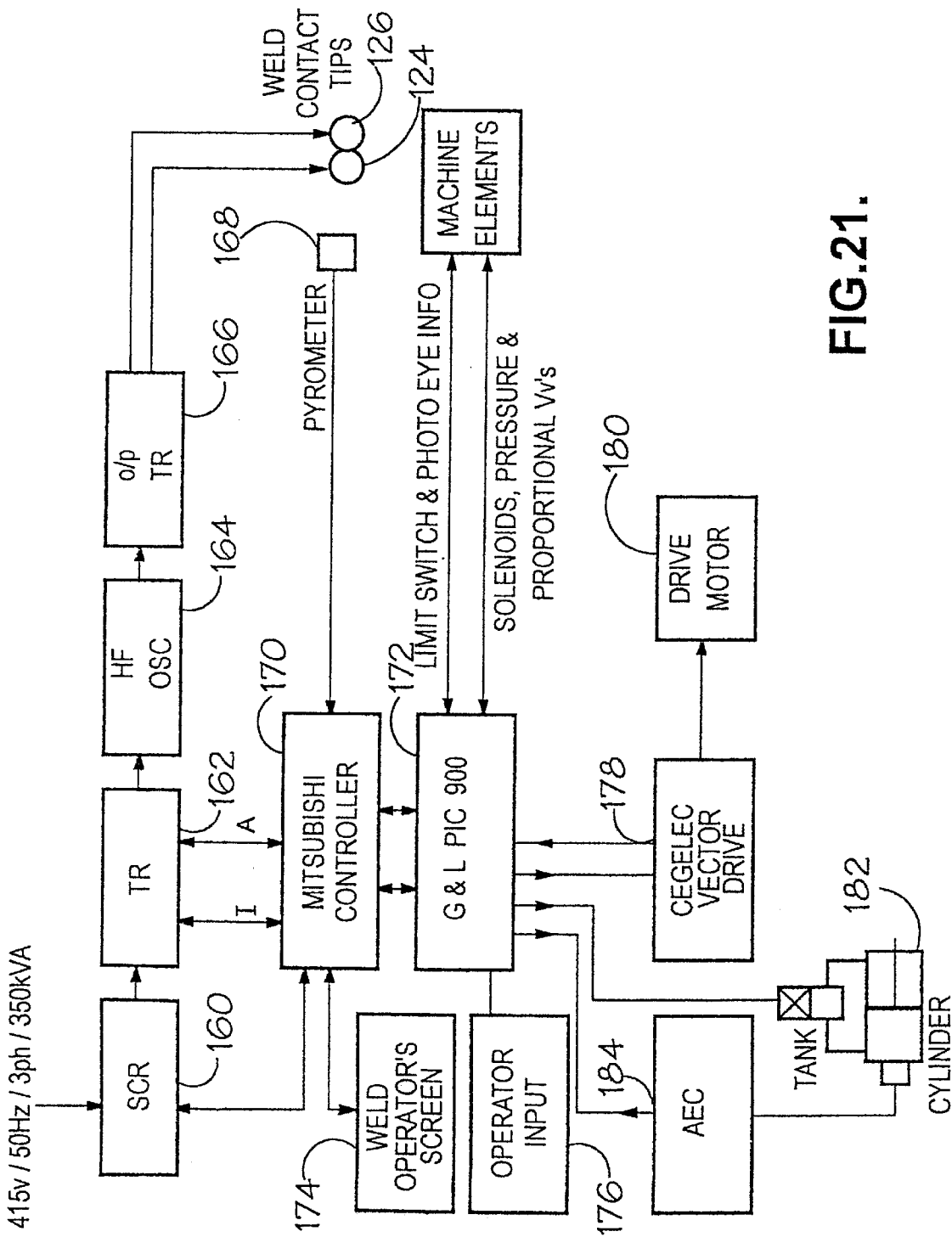
FIG. 21 is a block diagram of a control circuit used in the apparatus of FIG. 3.

FIG. 21 shows a control circuit used to control the apparatus of the present invention.

A silicon controlled rectifier (SCR) 160 acts as a power supply. Three phase input power is fed via a circuit breaker and magnetic contactor to thyristor stacks which control the output voltage from 0% to 100% by adjusting gate firing sequence, phase angle and timing. An automatic voltage regulator stabilizes the DC output voltage and protects against input voltage fluctuations.

Power from SCR 160 is fed to a main transformer (TR) 162 which transforms the voltage to a high voltage. The high voltage is fed to a high frequency oscillator unit (HF OSC) 164 which firstly converts the high voltage AC power from the transformer 162 to DC, and then feeds this DC voltage to an oscillator to generate a high frequency output. This output is then fed to a high frequency output transformer (o/p TR) 166 which converts the supply to low voltage, high current power which is applied to the weld contact tips or welding electrodes 124, 126.

A pyrometer 168 located above the welding zone monitors the colour of the weld and feeds a signal to a programmable logic controller (Mitsubishi Controller) 170 which varies the operation of the transformer 162 to maintain the correct welding temperature by varying the power supply to the electrodes.

A Programmable Industrial Computer (Giddings and Lewis PIC 900) 172 includes hardware and software elements. The hardware includes a system rack, hardware modules and I/O connectors under the control of a CPU. The software interacts with an operator input and output, such as a touch screen, to generate commands in response to operator input and program instructions, these commands being sent to hardware output modules which in turn control physical devices connected to the PIC.

In the present case, two touch screen operator interfaces 174, 176 are provided. Screen 174 is used to control the operation of controller 170, to change welding parameters (such as welding temperature). Screen 176 is used to control PIC 172 to change motion controls for the various hydraulic drives, pneumatic drives and motors of the apparatus, all of which are under the control of the PIC.

The Cegelec vector drive unit 178 uses motor speed or slip angle information and a model of motor characteristics to calculate the output waveform which will maintain an optimum field orientation for the coils of motor 180 under all motor speeds and loads. Motor 180 is preferably a 6 pole, 1000 rpm 449TC frame size Baldor motor having a 200 HP output, and a flange mounted planetary gearbox assembly.

As noted above, the position of the drawbench as calculated by the vector drive unit is used to control the positions of the inlet table roller assemblies, finpass assembly, welding assembly and pressure rollers. Each of these uses a hydraulic cylinder 182 having an associated AEC (Absolute to Encoder Converter) 184. The AEC 184 takes the output of a single linear displacement transducer and converts the signal to incremental encoder quadrature (square-wave-in-quadrature). The AEC takes two positions from the transducer. The difference or change is converted into quadrature pulses which are then used to control the movement of the hydraulic cylinders. The system allows a positional accuracy of 0.01 mm.

The PIC nay be programmed to operate in one of two modes. In the first mode, the cylinders are slaved to the position of the shaft, using the feedback from the linear displacement transducers to position the cylinders at the required setting for the current drawbench position. It is this mode which was described above.

In the second mode, the pressure rollers are positioned by the controller to their starting positions, and the PIC drops out of positional lock and instead goes to open loop control, applying a predetermined pressure to the hydraulic feed valves according to a predetermined voltage ramp. For any particular set of shafts, the amount of pressure to be applied to the hydraulic feed valves to maintain the correct roller pressure as the shaft moves through the output table can be determined over time.

The two modes can be used independently of one another on the various cylinders, i.e. the same mode need not be used on all cylinders. For example, in a case where a limited number is of pressure rollers are used for a narrow-tipped shaft, the additional rollers can be brought on line gradually as the taper increases. These additional rollers may be operated under pressure control to avoid a sudden increase in pressure which might damage or distort the shaft.

Because the datum line of the system is the center line of the shaft, the correct positions of the pressure cylinders, welding assembly, finpass assembly and inlet table stations can be calculated based on the drawbench position, once the tip diameter, shaft length and butt diameter are known. The system is thus extremely versatile in allowing for different types of shafts to be welded.

Figure 2:
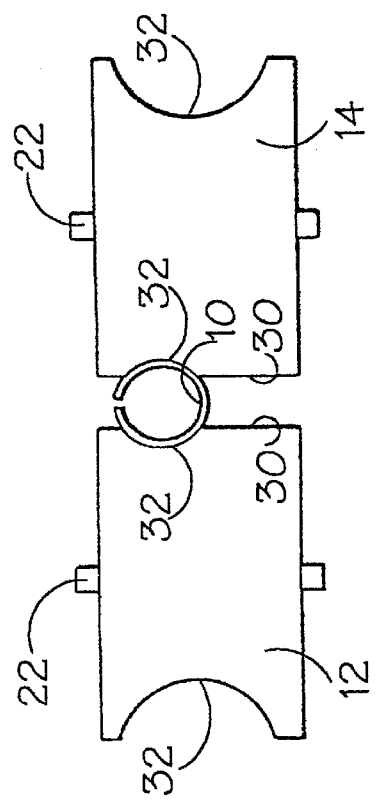
FIG. 2 is a sectional elevation of the apparatus of FIG. 1 taken along the line II—II in FIG. 1.
Figure 1:
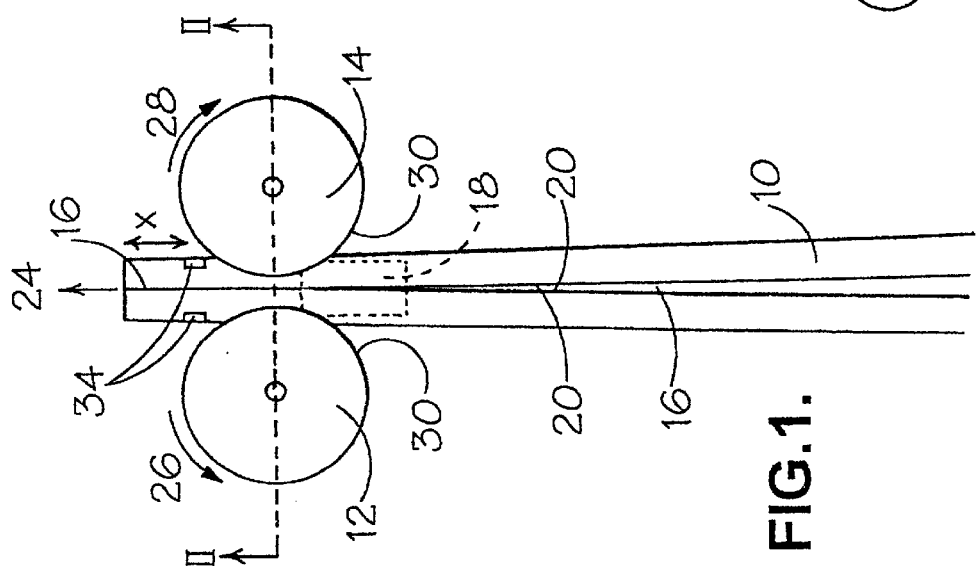
FIG. 1 is a plan view of a known apparatus for closing an open shaft.

An important additional advantage over the apparatus of FIGS. 1 and 2 is that the apparatus of the present invention is by comparison frictionless. The prior art apparatus exerts a considerable retarding friction on the shaft as it is drawn through. In comparison, the forces exerted by the pressure rollers of the present invention are directed almost entirely radially, and the frictional force in the axial direction is minimal since the pressure rollers are free to rotate as the shaft moves through the center section.

This means that there are lower maintenance costs, lower power requirements, and there is less strain on the components of the apparatus. Furthermore, since less traction is exerted on the grip holes near the tip, the distance x (FIG. 1) can be reduced substantially, thereby reducing wastage when trimming the finished shaft.

The dimensions of the cylindrical rollers of FIG. 1 also impose a minimum amount of wastage between the tip of the shaft and the beginning of the weld (which can only start after the jaws can engage the grip holes). The welding apparatus is at one side of the closely spaced rollers, and the grip holes must be on the opposite side when welding begins. The diameter of the rollers therefore has a significant effect on the length of the unwelded seam at the tip end of the shaft. In comparison, the jaws on the present embodiment can be spaced just past the pressure rollers, with the welding electrodes just in front of these rollers, thereby reducing the amount of wastage by an order of magnitude.

Yet a further advantage is that the dimensions of shafts which can be manufactured by the apparatus and method of the present invention are not constrained by an upper limit on large roller sizes (as in the case of apparatuses of the FIG. 1 type). By simply providing a sufficient number of pressure rollers of the correct dimensions, shafts of any size can be made. Extreme tapers can be accounted for by optionally reducing the number of pressure rollers in contact with the shaft at the beginning of the weld and bringing further rollers into play as the diameter of the shaft increases.

Changes and modifications in the specifically described embodiments can be carried out without departing from the principles of the invention, which is intended to be limited only by the scope of the appended claims, as interpreted according to the principles of patent law.

What is claimed is:

1. A method for welding a tapered shaft having an open seam defined between opposed longitudinal edges, said method comprising;

moving a tapered shaft along its longitudinal axis relative to a plurality of rollers arranged substantially symmetrically around a common fixed axis and each inclined at an acute angle relative to its next adjacent neighbors on each side, each of said plurality of rollers being movable by hydraulic pressure radially of the fixed axis for applying inwardly directed radial forces to the shaft at a plurality of discrete points spaced circumferentially around the shaft surface;

controlling the movement of said rollers radially of the fixed axis to account for the taper and progressively close the seam as it passes said rollers; and progressively welding the seam after it is closed by said rollers; wherein the step of controlling the movement of the rollers includes using a control computer to vary the hydraulic pressure applied to the rollers by open loop control according to a predetermined voltage ramp.

2. A method according to claim 1, wherein said step of controlling the movement of said rollers comprises varying the positions of said rollers in response to the longitudinal position of the shaft relative to said rollers, according to a predetermined taper profile.

3. A method according to claim 2, wherein the positions of said rollers are under the control of said computer and wherein said taper profile is stored in a memory associated with said computer.

4. A method according to claim 1, wherein said step of controlling the movement of said rollers comprises sensing the force exerted by said rollers on the shaft and varying the force exerted according to a predetermined pressure profile.

5. A method according to claim 4, wherein the positions of said rollers are under the control of said computer and wherein said pressure profile is stored in a memory associated with said computer.

6. A method according to claim 1, wherein said rollers are permitted to rotate freely as the shaft moves along its longitudinal axis.

7. A method according to claim 1, wherein the welding of the seam results in a raised weld being formed on the surface of the closed shaft and wherein one of said rollers is located to contact the shaft along said seam, said one of said rollers being provided with a groove to accommodate the raised seam.

8. A method according to claim 1, wherein said opposed longitudinal edges of the shaft form a "V" shape at the point where they are brought into contact, and wherein said welding step comprises passing a current along one arm of said "V" shape, through the apex of the "V" shape, and along the other arm of the "V" shape, whereby said welding is accomplished using electrical resistance welding.

9. A method according to claim 8, wherein the angle of said "V" shape is maintained by a finpass assembly located between the opposed longitudinal edges of the seam upstream of the point where the radial forces are applied.

10. An apparatus for welding a tapered shaft having an open seam defined between opposed longitudinal edges, said apparatus comprising:

a plurality of rollers arranged substantially symmetrically around a common fixed axis and each inclined at an acute angle relative to its next adjacent neighbors on each side, each of said plurality of rollers being movable by hydraulic pressure radially of the fixed axis for applying inwardly directed radial forces to the shaft at a plurality of discrete points spaced circumferentially around the shaft surface;

means for moving the shaft along its longitudinal axis relative to said rollers;

control means for moving said rollers radially of the fixed axis to account for the taper and progressively closing the seam as it passes said rollers; and means for progressively welding the seam after it is closed by said rollers; wherein said control means includes a control computer for varying the hydraulic pressure applied to said rollers by open loop control according to a predetermined voltage ramp.

11. An apparatus according to claim 10, wherein said rollers are arranged in a generally circular array and wherein each of said rollers is movable radially relative to the shaft to vary the radial force applied thereto.

12. An apparatus according to claim 11, wherein said control means is adapted to vary the positions of said rollers in response to the longitudinal position of the shaft relative to said rollers, according to a predetermined taper profile.

13. An apparatus according to claim 12, wherein said taper profile is stored in a memory associated with said computer.

14. An apparatus according to claim 11, further comprising a plurality of sensors for sensing the force exerted by said rollers on shaft, wherein said control means is adapted to vary the positions of said rollers in response to a predetermined pressure profile.

15. An apparatus according to claim 14, wherein said pressure profile is stored in a memory associated with said computer.

16. An apparatus according to claim 10, wherein a number of said rollers in contact with the shaft may be varied to account for the taper of the shaft.

17. An apparatus according to claim 10, wherein said rollers are permitted to rotate freely as the shaft moves along its longitudinal axis.

18. An apparatus according to claim 16, wherein one of said rollers is located to contact the shaft along said seam, said one of said rollers being provided with a groove to accommodate a raised weld formed on the surface of the closed shaft.

19. An apparatus according to claim 18, where said longitudinal edges of the shaft form a "V" shape at the point where they are brought into contact, and wherein said means for progressively welding the seam passes a current along one arm of said "V" shape, through the apex of said "V" shape, and along the other arm of said "V" shape, whereby the welding is accomplished using electrical resistance welding.

20. An apparatus according to claim 19, further comprising a finpass assembly located between the opposed longitudinal edges, the seam upstream of said rollers whereby the angle of said "V" shape is maintained by said finpass assembly.

21. An apparatus according to claim 20, wherein said rollers comprise one of a number of sets of such rollers, the shaft passing through each set in turn.

22. An apparatus according to claim 21, further comprising an inlet table for receiving the open shafts before welding and for rotating the open shafts about their longitudinal axes to correctly position the seam in relation to the welding assembly.

23. An apparatus according to claim 10, further comprising an outlet table onto which the closed shafts are received after welding.

24. An apparatus according to claim 10, wherein one of said rollers is located to contact the shaft along said seam, said one of said rollers being provided with a groove to accommodate a raised weld formed on the surface of the closed shaft.

25. An apparatus according to claim 10, wherein said opposed longitudinal edges of the shaft form a "V" shape at the point where they are brought into contact, and wherein said means for progressively welding the seam passes a current along one arm of said "V" shape, through the apex of said "V" shape, and along the other arm of said "V" shape, whereby the welding is accomplished using electrical resistance welding.

26. An apparatus according to claim 25, further comprising a finpass assembly located between the opposed longitudinal edges of the seam upstream of said rollers whereby the angle of said "V" shape is maintained by said finpass assembly.

27. An apparatus according to claim 10, wherein said opposed longitudinal edges of the shaft form a "V" shape at the point where they are brought into contact, and wherein said means for progressively welding the seam passes a current along one arm of said "V" shape, through the apex of said "V" shape, and along the other arm of said "V" shape, whereby the welding is accomplished using electrical resistance welding.

28. An apparatus according to claim 27, further comprising a finpass assembly located between the opposed longitudinal edges of the seam upstream of said rollers whereby the angle of said "V" shape is maintained by said finpass assembly.

29. An apparatus according to claim 10, wherein said rollers comprise one of a number of sets of such rollers, the shaft passing through each set in turn.

30. An apparatus according to claim 10, further comprising an inlet table for receiving the open shafts before welding and for rotating the open shafts about their longitudinal axes to correctly position the seam in relation to the welding assembly.

* * * * *

UNITED STATES PATENT AND TRADEMARK OFFICE
CERTIFICATE OF CORRECTION

PATENT NO. : 6,629,632 B1 Page 1 of 1
APPLICATION NO. : 09/705482
DATED : October 7, 2003
INVENTOR(S) : Jack et al.

It is certified that error appears in the above-identified patent and that said Letters Patent is hereby corrected as shown below:

Column 11:
Line 64, Claim 1, ";" should be --:--

Column 13:
Line 10, Claim 12, "claim 11" should be --claim 10--
Line 17, Claim 14, "claim 11" should be --claim 10--
Line 19, Claim 14, Insert --the-- before "shaft"
Line 36, Claim 19, "where" should be --wherein--
Line 37, Claim 19, Insert --opposed-- before "longitudinal"
Line 46, Claim 20, Delete --,-- after "edges"
Line 46, Claim 20, Insert --of-- before "the seam"

Signed and Sealed this

Fifteenth Day of August, 2006

JON W. DUDAS
*Director of the United States Patent and Trademark Office*